No. 882,911. PATENTED MAR. 24, 1908.
T. B. RICE, Jr.
CLUTCH.
APPLICATION FILED SEPT. 25, 1905.
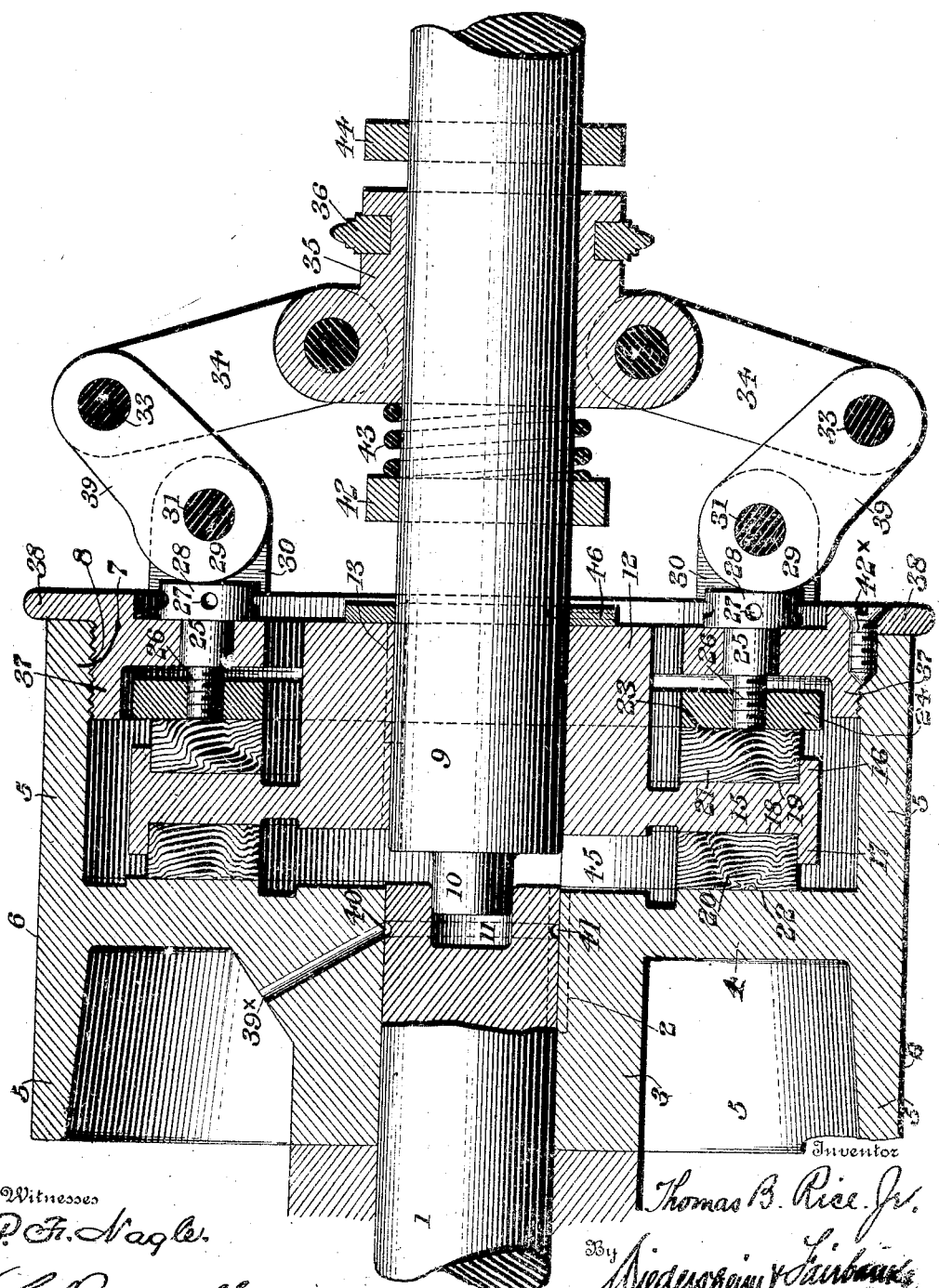

UNITED STATES PATENT OFFICE.

THOMAS B. RICE, JR., OF PHILADELPHIA, PENNSYLVANIA.

CLUTCH.

No. 882,911.　　　Specification of Letters Patent.　　Patented March 24, 1908.

Application filed September 25, 1905. Serial No. 279,911.

*To all whom it may concern:*

Be it known that I, THOMAS B. RICE, Jr., a citizen of the United States, residing in the city and county of Philadelphia, State of Pennsylvania, have invented a new and useful Clutch, of which the following is a specification.

In a clutch mechanism it is quite desirable to have the one clutch member embraced between a pair of the oppositely movable members in order that firm gripping action may be had.

A further purpose of my invention is to make the time and extent of the clutching action adjustable.

A further purpose of my invention is to provide a novel construction of gripping jaws for a clutch of the kind described.

A further purpose of my invention is to support and guide one of two shafts during the clutching action or movement, when being clutched or released.

It further consists of other novel features of construction, all as will be hereinafter fully shown and described.

The figure represents a longitudinal section through the center of a clutch, embodying my invention.

1 designates a shaft rotated in any suitable manner and attached by a key 2 to the collar 3 of one member of my clutch, which is the longitudinally stationary member and which is supplied with an outwardly extending annular web 4, at the outer end of which is located a preferably cylindrical flange 5 extending in both directions as shown, substantially parallel with the shaft, and providing a bearing face 6 for any suitable belt when it is desired to apply the power at this point. The end portion 7 is internally screw threaded at 8.

9 designates the shaft to which it is intended to impart rotary motion, which shaft 9 terminates in a reduced extension or neck 10, adapted to fit within a recess 11 in the end of the shaft 1. The second member 12 of my clutch is splined at 13 to said shaft 9 so as to have movement thereon, and, has extending outwardly therefrom, an annular web 15 having oppositely extending flanges 16 and 17, providing, on the inside thereof, seats 18 and 19 for annular bearing faces 20 and 21, which form oppositely facing friction surfaces each shown as formed of wood but capable of substitution by any suitable friction material which wears more rapidly than the material of which the clutch parts are formed, and which can readily be replaced as seen.

The face 22 of the friction material 20 is adapted to make contact with the adjoining face of the web 4, and the face 23 of friction material 21 is adapted to make contact with the adjoining face of an annular band ring or disk 24, which constitutes a gripping member and which is movable longitudinally of the shaft 9 by means of screws or studs 25. These are adjustable therein, being threaded at 26 and being turned by means of a spanner wrench engaging the spanner holes 27. The heads 28 of these screws are within the range of movement of a cam 29 upon the links 39 which are supported at this point by pins 31, held by ears 30, as hereinafter described, to revolve with the end portion 7. The links 39 are pivoted at 33 to links 34, which at their other ends are pivoted to the sleeve 35, said links being suitably proportioned and positioned in such manner that longitudinal movement of said sleeve by movement of the collar 36 will cause the cams 29 to bear upon screws 25, forcing the ring 24 inwardly. The end of the pulley is partially closed by a ring 37 having a flange 38 thereon, which ring is screw threaded into said flange 5 and which is provided with guiding apertures for the screws 25, supports the ears 30 and at the same time protects structure from mechanical interference and keeps it clean. It makes it possible to retain any desired lubricating or cooling fluid within the clutch, which may be inserted through openings 39× and 40, channel 41 keeping these constantly in connection. A ring 42 is fixed to shaft 9 in any suitable way and interposed between it and the sleeve 35 is a spring 43 which provides for the recovery or release of the movable ring 24 to release the clutch. Upon the shaft 9 on opposite side of the sleeve 35 I place a ring 44, which acts as a stop for the movement of said sleeve 35.

I provide an aperture 45 in communication with the space or recess 11 which is suitable for the reception of lubricating fluid.

I lock the parts 7 and 37 by interposing a screw 42× between the threads thereof at any suitable point.

A sleeve 46 secured to the shaft 9 limits the motion of member 12 in a lateral direction.

The operation is as follows:—The parts are normally in such position that the cams upon the links 39 do not engage with the screw heads. The screws are so adjusted as to secure the necessary extent of movement of the annular ring 24 and at the limit of the motion, to engage the web 15, with its two friction surfaces, with the web 4 with sufficient rigidity to make them revolve in unison. By movement of the sleeve 35 toward the friction surfaces, the cams upon the links 39, force the screws and therefore the annular band 24 inwardly, causing slight frictional engagement first and ultimate complete gripping contact. The shaft 9 is free to move longitudinally to a slight extent and without necessarily moving the member 12 with it. The splining insures that the member 12 rotate whenever the shaft rotates and at the same rate. The sleeve 46 limits this motion of member 12 longitudinally and prevents the shaft from being entirely removed from the member 12 by the spline contacting with the sleeve 46.

During a large portion, if not all of the longitudinal movement of the shaft 9, the reduced end of this shaft is in engagement with the walls of the recess 11 of the shaft in alinement therewith, which guides the clutch in its movement and adds to the rigidity of the friction joint formed by preventing side vibration thereof. There will normally be sufficient oil in this recess 11 to cushion the movement of the shaft. The movement of the sleeve 35 is considerably in excess of that of the shaft compression spring 43 and using this spring to replace the sleeve 35 after release of the clutch, the ultimate limit of movement of the sleeve 35 being set by the stop 44, the extent of movement of 24 is not absolutely uniform. The definite limit to such movement may be set as shown in the drawings, by the engagement of the heads of the screws with the adjoining metal, but ordinarily these screw heads will not come into engagement with the metal. Because the ring 24 will recede from the joining friction parts ordinarily just sufficient to free from contact therewith, the extent of movement of the ring is ordinarily nearly the same, but the positions between which movement takes place will evidently vary with the amount of wear upon the wooden or other friction surfaces, and consequently the portions of the cams engaging with the screws will vary, necessitating a slightly different degree of compression of the spring 43.

Whenever the wear upon the friction surfaces requires, the screws may be loosened in the ring 24 to extend the reach of this ring within the clutch and take up the wear.

Having thus described my invention, what I claim as new and desire to secure by Letters Patent, is:—

1. In a friction clutch, a longitudinally stationary member, a ring carried thereby, screws freely passing through said ring, a frictional ring carried by said screws and adjustable thereon, a longitudinally movable member, a web extending therefrom between said stationary member and said frictional ring, independent annular bearing faces extending entirely around the faces of said web on each side thereof, and means for actuating said frictional ring for causing the two annular bearing faces to be engaged by said stationary member and said frictional ring.

2. In a frictional clutch, a longitudinally stationary member, a ring carried thereby, screws freely passing through said ring, a frictional ring carried by said screws and adjustable thereon, a longitudinally movable member, a web extending therefrom between said stationary member and said frictional ring, oppositely extending flanges on said web annular bearing faces on each side of said web and seated against said flanges, and means for actuating said frictional ring for causing the two annular bearing faces to be engaged by said stationary member and said frictional ring.

T. B. RICE, Jr.

Witnesses:
R. H. LUNT,
T. L. BERRIPI.